United States Patent
Schliebs et al.

[15] 3,686,349
[45] Aug. 22, 1972

[54] PROCESS FOR RECOVERING CYCLOPENTENE, ISOPRENE AND A DIOLEFIN STREAM FROM THE $C_5$-CUT OBTAINED BY PETROLEUM CRACKING

[72] Inventors: Reinhard Schliebs; Hans-Walther Brandt, both of Cologne-Flittard; Bruno Engelhard, Cologne-Stammheim; Heinrich Steude, Leverkusen; Helmut Scherb, Sinnersdorf; Gunther Schnuchel, Dormagen, all of Germany

[73] Assignees: Farbenfabriken Bayer Aktiengesellschaft, Leverkusen; Erdolchemie Gesellschaft mit beschrankter Haftung, Cologne, Germany

[22] Filed: Aug. 20, 1969
[21] Appl. No.: 851,661

[30] Foreign Application Priority Data
May 23, 1968 Germany..........P 17 93 254.6

[52] U.S. Cl. ..............260/681.5, 260/666, 203/71, 203/81, 203/53, 203/57
[51] Int. Cl...........................B01d 3/40, C07c 7/00
[58] Field of Search................203/57, 58, 53, 43–46, 203/71, 81; 260/681.5, 666

[56] References Cited

UNITED STATES PATENTS

| | | | |
|---|---|---|---|
| 2,925,452 | 2/1960 | Broughton | 260/681.5 |
| 3,201,492 | 8/1965 | Sherk | 260/681.5 |
| 3,320,138 | 5/1967 | Brandt et al. | 260/681.5 |
| 3,345,287 | 10/1967 | Voetter et al. | 260/681.5 |
| 3,510,405 | 5/1970 | Takao et al. | 260/681.5 |

FOREIGN PATENTS OR APPLICATIONS

| | | | |
|---|---|---|---|
| 1,072,687 | 6/1967 | Great Britain | 260/681.5 |

*Primary Examiner*—Wilbur L. Bascomb, Jr.
*Attorney*—Burgess, Dinklage & Sprung

[57] ABSTRACT

A cyclopentene rich fraction, an isoprene rich fraction, and a diolefin (essentially 1,3-pentadiene and cyclopentadiene) rich fraction are recovered from the $C_5$ cut obtained by petroleum cracking. First, said fractions are extracted in a liquid-liquid extraction with 1-oxo-1-methylphospholine. The extractant is then distilled to separate therefrom said fractions.

4 Claims, 1 Drawing Figure

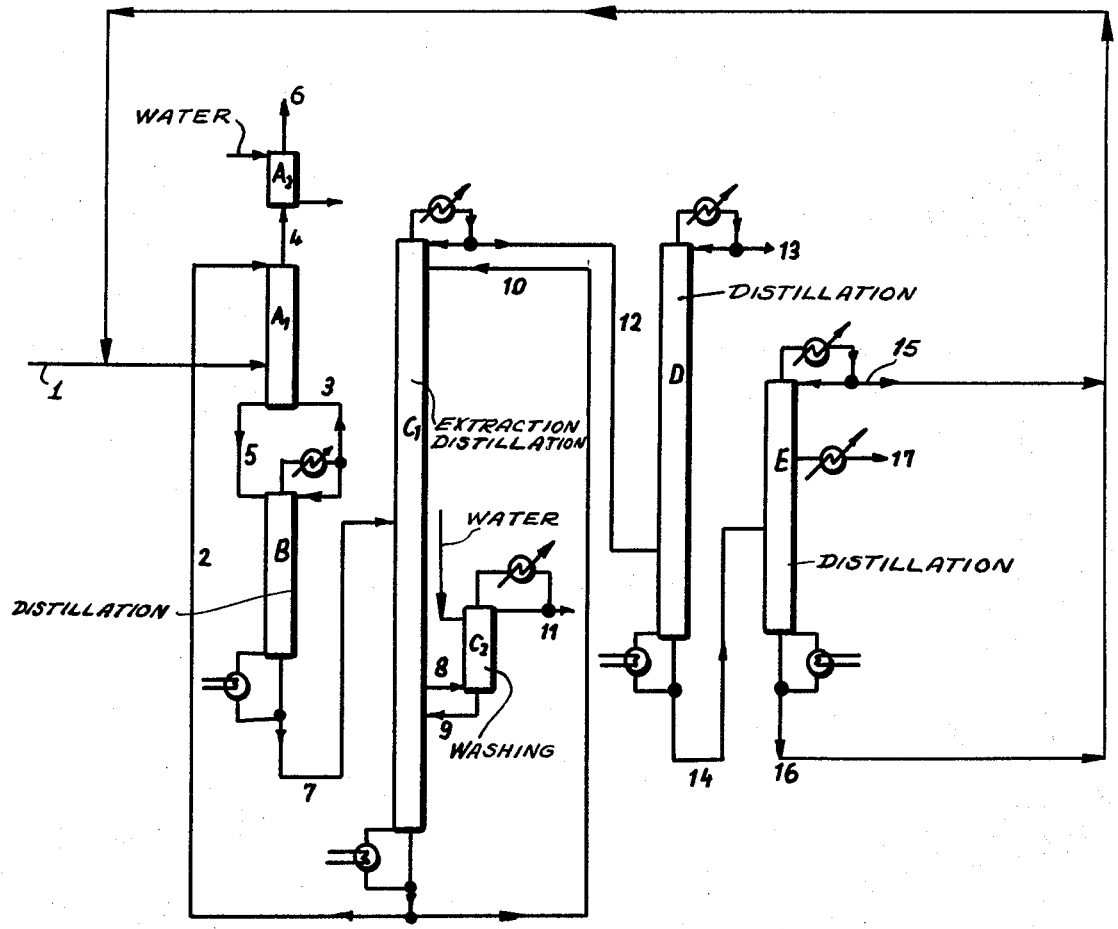

PROCESS FOR RECOVERING CYCLOPENTENE, ISOPRENE AND A DIOLEFIN STREAM FROM THE $C_5$-CUT OBTAINED BY PETROLEUM CRACKING

This invention relates to a process for recovering cyclopentene, isoprene and a diolefin stream from the $C_5$ cut obtained by petroleum cracking.

It is known that hydrocarbons with substantially the same boiling points can be dissociated in the presence of selective solvents, for example N-methyl pyrrolidone, acetonitrile, dimethyl sulphoxide, dimethyl formamide and aniline (cf. for example DAS No. 1,059,436, DAS No. 1,184,334 and U.S. Pat. No. 3,249,532). If this is done by extractive distillation, the separation factors corresponding to the selective solvents used are of critical significance to the separation and hence to the expense which it involves.

In cases where it is desired to isolate isoprene and cyclopentene from a $C_5$ cut obtains by petroleum cracking in the high purities required for polymerization, it is necessary both to remove paraffin and olefin level in the petroleum fraction to a value below 0.5 percent by weight and to reduce the residual diolefin content to a value below 200 ppm, so that the cyclopentadiene content becomes less than 5 ppm and in some cases less than 1 ppm. This separation has to be carried out with selective solvents which show high separation factors as between olefins and isoprene and as between isoprene and the remaining diolefins, especially cyclopentadiene.

Unfortunately, conventional solvents only have adequate separation factors either in the separation of paraffins and olefins from the diolefins (for example N-methyl-pyrrolidone) or in the separation of the diolefins from one another (for example aniline).

Basically, the requisite purity levels for isoprene can be obtained with conventional solvents, for example N-methyl pyrrolidone, in the separation of diolefins. However, the solvent circuit required, the reflux ratio and the necessary number of trays in the columns are all very large. It is also possible to use two solvents in one installation for the two different separation problems. Although it is possible in this way to reduce the actual outlay involved in the separation, the use of two solvent circuits involves considerable extra expense in terms of apparatus.

Each solvent has to be regenerated in suitable vessels and columns. In addition, the two circuits have to be clearly separated from one another and hydrocarbons have to be completely removed twice from the solvents which involves a considerable energy requirement.

We have now found that (a) cyclopentene and (b) isoprene and (c) a diolefin stream essentially containing 1, 3-pentadiene and cyclopentadiene can be obtained from $C_5$-hydrocarbon mixtures containing these hydrocarbons in addition to other saturated and unsaturated hydrocarbons provided the hydrocarbon mixture is subjected with 1-oxo-1-methylphospholine as the selective solvent to a liquid-liquid extraction in conjunction with an extractive distillation. By virtue of the 1-oxo-1-methylphospholine, it is possible economically to operate with only one solvent in a plant for the production of isoprene.

Water may be added to the 1-oxo-1-methylphospholine, for example in a quantity of from 1 to 20 percent by weight and preferably in a quantity of from 5 to 10 percent by weight, in order to increase its selectivity and to reduce its boiling point of 272° C.

The following Table sets out the separation factors for several different infinitely diluted solvents and the key components 2-methyl-2-butene and cyclopentadiene which are of critical importance in the isolation of isoprene. If a comparison is made between the values for N-methyl pyrrolidone (NMP) containing 8 percent of water, for aniline without any water in it and for 1-oxo-1-methylphospholine containing 2 percent of water, the forms in which these solvents are used in practice, the advantages of 1-oxo-1-methylphospholine are clearly apparent.

Separation factors at 20° C.

|  | 1-oxo-1-methyl phospholine | | NMP | | Aniline |
|---|---|---|---|---|---|
|  | $+0\%H_2O$ | $+2\%H_2O$ | $0\%H_2O$ | $+8\%H_2O$ | $0\%H_2O$ |
| 2-methyl-2-butene | 2.18 | 2.20 | 1.95 | 2.12 | 1.57 |
| cyclopentadiene | 2.70 | 2.58 | 2.00 | 2.22 | 2.50 |

For example, about half of the $C_5$-hydrocarbon cut used for the process according to the invention (boiling point around 28°–46° C.) as obtained for example in the cracking of mineral oils and their fractions or in the catalytic dehydrogenation of $C_5$-isoparaffins and olefins, may consist of pentanes and pentenes. The rest essentially contains diolefins, optionally $C_5$-acetylenes, cyclopentene and cyclopentane. The cyclopentene content amounts to between about 0.5 and 10 percent by weight.

One embodiment of the process according to the invention is now described with reference to the accompanying drawing.

The hydrocarbon mixture in liquid form is delivered through a pipe 1 to the lower half of an extraction column $A_1$. The solvent flows into the upper end of the column through a pipe 2. The lower part of the column is used for an intensifying extraction to which a $C_5$-diolefin stream is fed in the liquid phase from a column B via a pipe 3. The raffinate, paraffins, olefins and small quantities of diolefins, flows through a pipe 4 to a water washing stage $A_2$ where any residual traces of solvent are washed out, and is removed through a pipe 6. The solvent laden with diolefins and to a limited extent with pentenes leaves the column $A_1$ through a pipe 5 and is subjected to distillation to separate as a first fraction cyclopentene and isoprene (overhead of column $C_1$) and as a second fraction 1,3-pentadiene and cyclopentadiene (intermediate product of column $C_1$). More particularly the laden solvent is delivered to the head of the column B. From the lower end of this column, the solvent laden with diolefins, cyclopentene and $C_5$-acetylene is delivered partly degassed into the middle of a column $C_1$ through a pipe 7. The vapors removed are condensed at the head of the column B, some being recycled to the column B and the rest being delivered in the liquid phase to the lower part of the extraction column $A_1$. A few plates above the sump of the column $C_1$, a diolefin stream substantially free from cyclopentene and isoprene and containing pentadiene and cyclopentadiene is removed in the gas phase through a pipe 8. The entrained solvent vapor is washed out with water in the following side-column $C_2$. The diolefin stream is removed condensed through a pipe 11. The washing water flows through a pipe 9 to a column $C_1$.

The hydrocarbon-free solvent flows off at the sump of the column $C_1$ and flows through the pipe 2 to the extraction stage and through a pipe 10 into the column $C_1$ a few plates beneath its head. A gas mixture containing substantially only isoprene and cyclopentene is condensed at the head of the column $C_1$. This mixture flows through a pipe 12 to a column D where, through normal distillation, it is split up into 99.9 percent pure isoprene containing less than 1 ppm of cyclopentadiene at the head 13 of the column D and a mixture rich in cyclopentene at the sump. The sump product 14 from the column D is redistilled in a column E, pure cyclopentene being obtained in a sidestream 17. Both the head product and the tail product from the column E (15 and 16) are recycled to the inlet pipe 1.

The invention is illustrated by the following example:

EXAMPLE 7,350 cc/hour of a $C_5$-hydrocarbon but containing approximately 67.5 percent of pentane and pentene, 2 percent of cyclopentene, 13.5 percent of isoprene and 17 percent of residual diolefins are introduced in the liquid phase at the 20th plate of a pulsating sieve-plate column $A_1$ (35 mm diameter) with 80 plates. This liquid-liquid extraction takes place at 15° C. and 760 mm. The feed rate of 1-oxo-1-methylphospholine containing 2 percent of water, which is used as the selective solvent, is the 80th plate of the column to 8,500 cc/hour.

The head of the column is followed by a water-washing stage with 10 sieve plates. The hydrocarbon-laden solvent running off to the lower end is delivered at the head of 80 mm diameter, 40 plate laboratory column B. A solvent stream with an approximately 13 percent hydrocarbon load is removed and delivered to the 84th plate of column $C_1$ (laboratory plate column 80 mm in diameter with a bubble-plate/head pressure of 760 mm.), at a temperature of around 45° C.

At the 105th plate, a solvent stream flowing in line 10 at 13,000 cc/hour with a temperature of 40° C. runs into the column five plates below its head. The reflux ratio (liquid reflux to amount of liquid hydrocarbon removed) amounts to 7. At about 1,060 cc/hour of head product, approximately 7,420 cc/hour are refluxed. A diolefin stream is removed in the gas phase at the 15th plate, and the solvent vapors entrained are removed by treatment with water in a glass laboratory plate column $C_2$ (50 mm diameter, Schmickler-Fritz type) with 10 plates. The composition of the diolefin stream is as follows:

| | |
|---|---|
| isoprene | 1.5% by weight |
| 1,3-pentadiene | 38.5% by weight |
| cyclopentadiene | 60.0% by weight |

27,500 cc/hour of solvent are withdrawn from the sump of column $C_1$. This stream is divided up into streams 10 and 2, and stream 10 is recycled to the 105th plate of the column $C_1$ and stream 2 is passed to the liquid-liquid extraction stage $A_1$.

The $C_5$-hydrocarbon vapors arriving at the head of the column B are condensed. Approximately 215 cc/hour flow back as a reflux, and 430 cc/hour are delivered to the lower end of the sieve-plate column $A_1$.

The head product from the column $C_1$ is separated in a glass laboratory plate column (50 mm in diameter Schmickler-Fritz type) with 50 plates into isoprene true to specification at the head, and cyclopentene at the sump.

A following second glass laboratory plate column E with 30 plates is used to purify the cyclopentene which is then removed approximately 99.7 percent pure in the side stream Compositions:

| | Isoprene (13) | Cyclopentene (17) |
|---|---|---|
| isopentenes | 0.2% by weight | 0.1% by weight |
| cyclopentene | 0.1% by weight | 99.685% by weight |
| isoprene | 99.69% by weight | 0.2% by weight |
| pentadiene-1,3 | 0.1% by weight | 0.015% by weight |
| cyclopentadiene | less than 1 ppm | less than 1 ppm |

What we claim is:

1. A process of recovering a cyclopentene fraction, an isoprene fraction, and a fraction consisting essentially of the diolefins 1,3-pentadiene and cyclopentadiene, from a $C_5$-hydrocarbon mixture containing said hydrocarbons and other $C_5$ hydrocarbons which comprises:
   a. subjecting said $C_5$-hydrocarbons mixture to liquid-liquid extraction with a solvent comprising 1-oxo-1-methyl-pholine, to form an extraction stage effluent composed of said solvent having said fractions dissolved therein and a raffinate containing paraffins, olefins and a small amount of diolefins,
   b. the extraction stage effluent is subjected to distillation for partial degassing thereof,
   c. subjecting the degassed extraction stage effluent to extractive distillation in which the degassed extraction stage effluent is introduced into an intermediate point of the extractive distillation to provide an overhead product comprising said cyclopentane fraction and said isoprene fraction, and a sump product comprising said solvent, and withdrawing a sump product comprising said solvent, and withdrawing a side stream comprising said 1,3-pentadiene and cyclopentadiene at a place below the place of introduction of the degassed extraction stage effluent, introducing 1-oxo-1-methyl-pholine solvent above the point of introduction of the degassed extraction stage effluent adjacent the head of the extractive distillation,
   d. distilling the overhead product of the extractive distillation to produce the cyclopentane fraction and isoprene fraction.

2. Process according to claim 1, wherein the 1-oxo-1-methyl-phospholine used in extraction step (a) and in the extractive distillation step (c) contains 1 to 10 percent water.

3. Process according to claim 1, the 1-oxo-1-methyl-phospholine solvent introduced into the extractive distillation being part of said sump product.

4. Process according to claim 3, wherein the 1-oxo-1-methyl-phospholine used in extraction step (a) and in the extractive distillation step (c) contains 1 to 10 percent water.

* * * * *

UNITED STATES PATENT OFFICE
CERTIFICATE OF CORRECTION

Patent No. 3,686,349  Dated August 22, 1972

Inventor(s)  Reinhard Schliebs et al.

It is certified that error appears in the above-identified patent and that said Letters Patent are hereby corrected as shown below:

Page 1, box [30], Foreign Application priority date, change "May 23, 1968" to --Aug. 23, 1968--.

Col. 2, lines 15-20, the table should read as follows:

|  | 1-oxo-1-methyl phospholine | | NMP | | Aniline |
| --- | --- | --- | --- | --- | --- |
|  | + 0%$H_2O$ | + 2%$H_2O$ | 0%$H_2O$ | + 8%$H_2O$ | 0%$H_2O$ |
| 2-methyl-2-butene | 2.18 | 2.20 | 1.95 | 2.12 | 1.57 |
| Cyclopentadiene | 2.70 | 2.58 | 2.00 | 2.22 | 2.50 |

Col. 3, line 28, change "is the 80th plate of the column to" to --to the 80th plate of the column is--.

Col. 3, line 32, change "running of to" to --running of at--

Col. 4, line 2, after "column" insert --D--.

Signed and sealed this 30th day of January 1973.

(SEAL)
Attest:

EDWARD M. FLETCHER, JR.
Attesting Officer

ROBERT GOTTSCHALK
Commissioner of Patents